United States Patent [19]

Welsh et al.

[11] 4,173,617

[45] Nov. 6, 1979

[54] PREPARATION OF MANGANOUS CHLORIDE SOLUTION

[75] Inventors: Jay Y. Welsh, Catonsville; Irving Sochol, Baltimore, both of Md.

[73] Assignee: Chemetals Corporation, Baltimore, Md.

[21] Appl. No.: 880,447

[22] Filed: Feb. 23, 1978

[51] Int. Cl.² ............................................. C01G 45/06
[52] U.S. Cl. .................................... 423/34; 473/40; 473/51; 423/491; 75/109; 75/101 R
[58] Field of Search .................. 423/34, 40, 49, 50, 423/140, 150, 491; 75/101, 109, 112, 114, 121

[56] References Cited

U.S. PATENT DOCUMENTS

| 1,353,773 | 9/1920 | Marsh | 423/40 |
|---|---|---|---|
| 3,120,995 | 2/1964 | Hawkins et al. | 423/51 |
| 3,544,309 | 12/1970 | Fletcher et al. | 75/114 |
| 3,607,236 | 9/1971 | Brooks et al. | 75/112 |
| 3,880,651 | 4/1975 | Queneau et al. | 75/112 |
| 3,998,628 | 12/1976 | Gandon et al. | 423/40 |
| 4,016,055 | 4/1977 | Gandon et al. | 75/109 |

FOREIGN PATENT DOCUMENTS 453355  2/1975  U.S.S.R. ................................... 423/49

*Primary Examiner*—Brian Hearn
*Attorney, Agent, or Firm*—Keil & Witherspoon

[57] ABSTRACT

A method for the preparation of manganous chloride solutions using copper as a redox intermediate in the reaction between manganese and chlorine. Treatment of manganese-containing materials with a copper solution results in oxidation and dissolution of the manganese and the formation of elemental copper. The copper is in turn dissolved by reaction with cupric or ferric ions, which are then regenerated by chlorine oxidation.

15 Claims, No Drawings

PREPARATION OF MANGANOUS CHLORIDE SOLUTION

FIELD OF THE INVENTION

This invention relates generally to a method for the preparation of manganous chloride, and more particularly to a process for the preparation of manganous chloride solution from ferromanganese by reaction with elemental chlorine.

BACKGROUND OF THE INVENTION

Manganous chloride ($MnCl_2$) is useful in dyeing, disinfecting, ceramic coloring, the preparation of alloys, and as an intermediate in the preparation of a variety of other manganese compounds. It is also used to prepare high purity manganese metal by electrolysis of aqueous solutions.

There are numerous commercial methods for the preparation of manganous chloride. Manganese may be directly reacted with chlorine or hydrochloric acid in a hot reactor or aqueous medium. Manganese ore may be reacted directly with hydrogen chloride, treated with ferrous chloride and sulfide, or fused with $CaCl_2/MgCl_2$ to produce manganous chloride. Other methods react manganese carbonate or reduced manganese ore with hydrochloric acid.

Many of these methods require the use of high reaction temperatures and specialized equipment to carry out the reaction and to separate the volatile products. Others, conducted in solution, result in the evolution of large volumes of hydrogen gas with its attendant hazards and foaming problems, or incur appreciable manganese loss due to inefficiencies. In the case of aqueous reactions involving chlorine, the manganese is often oxidized to insoluble manganic hydroxide which results in loss of manganese values and poor process efficiency. In addition, if manganous chloride of high purity is the desired product, it is usually necessary to use a relatively pure, and therefore expensive, manganese source.

It would therefore be desirable to provide a process for the preparation of manganous chloride solutions which does not require the use of large amounts of heat energy or special equipment, and which does not suffer from the disadvantage of excessive gas evolution. It would be an additional benefit to provide a process which produces a pure manganous chloride solution from an inexpensive source of manganese.

SUMMARY OF THE INVENTION

It has been discovered that manganous chloride solutions can be prepared by contacting a manganese-containing metal such as ferromanganese, manganese alloy, or electrolytic manganese with an acid aqueous solution containing dissolved copper in the form of cuprous and cupric ions. The elemental manganese will be solubilized by oxidation to manganous ions, with a corresponding reduction of the copper ions to elemental copper. The copper metal is in turn dissolved by reaction with cupric ions in solution, and the resulting cuprous ions are oxidized by the introduction of chlorine into the solution.

The remaining insolubles are then separated from the solution, and sufficient manganese-containing material is introduced into the solution to provide a stoichiometric excess of manganese in relation to copper, in order to reduce substantially all of the copper to the elemental state. This copper metal and unreacted manganese source is then separated from the solution, leaving an aqueous solution rich in manganous chloride. The solution may then be further treated by conventional methods to remove metal contaminants and a high purity manganous chloride recovered.

The method of the invention provides numerous advantages over previous practices. The reactions are carried out in aqueous solution, and neither high temperatures nor special equipment is required. The introduction of chlorine into the solution is smooth, with little or no hydrogen evolution. Foaming problems are avoided, as are losses of manganese values through the formation of insoluble hydroxides.

Further, the method is adaptable to a broad range of materials as a source of manganese. It is a particular economic advantage that relatively inexpensive materials such as high carbon ferromanganese work well in the process, and under the proper conditions the presence of iron in the manganese source may even improve the overall efficiency.

An additional advantage lies in the capability of recycling the copper used as a redox intermediate. Metallic copper may be continuously recovered and reused, thereby lowering still further the cost of the method.

DETAILED DESCRIPTION OF THE INVENTION

Overall, the method of the invention is based on the reaction of a manganese-containing material with chlorine. However, rather than a direct reaction which is difficult to control, the method uses copper as a redox intermediate. This step allows the various reactions to proceed smoothly and efficiently, without undesirable side reactions.

Numerous materials are suitable as a source of manganese. Impurities in the source are not a major consideration, and materials ranging from electrolytic manganese to alloys such as high carbon ferromanganese are useful. The ferromanganese alloy has been found to be particularly suitable, and high carbon ferromanganese fines are an economical source. The low and medium carbon grades of ferromanganese are also good sources, although they are of course more expensive.

The manganese-containing material is contacted with an aqueous solution which contains dissolved copper. The contact is carried out as a straightforward leaching procedure, usually in the form of an agitated slurry. Other procedures such as countercurrent column leaching and percolation beds may also be used, but are often unnecessarily complex. The manganese-containing material may be crushed or ground if necessary to reduce particle size and maximize contact area with the aqueous solution.

The chemistry of the leaching step can be indicated by a series of chemical equations. While the various reactions will be set forth as a sequence, and indeed may be conveniently classified as "steps" in the overall method, it should be understood that many of the reactions will be occurring simultaneously under normal conditions. It should also be clear that the method of the invention can be carried out batchwise, semi-continuously, or continuously without altering the basic chemistry involved. This is true not only of the leaching step, but also the subsequent separation and recovery steps.

The following equations and discussion will illustrate the use of ferromanganese as a manganese source in the method of the invention. The presence of iron, which will normally be found as an impurity in most manganese-containing materials, has been found to have a beneficial effect on the leaching step. However, the presence of iron is not required for proper operation of the method, and the use of ferromanganese for illustrative purposes should not be construed as limiting in any sense.

The principal reactions involved in the leaching step are:

A. Leaching Reactions $$Mn° + Cu^{+2} \rightarrow Mn^{+2} + Cu° \qquad (1)$$

$$Mn° + 2Cu^{+1} \rightarrow Mn^{+2} + 2Cu° \qquad (2)$$

$$Fe° + Cu^{+2} \rightarrow Fe^{+2} + Cu° \qquad (3)$$

$$Fe° + 2Cu^{+1} \rightarrow Fe^{+2} + 2Cu° \qquad (4)$$

B. Chlorine Absorption Reactions $$2Fe^{+2} + Cl_2 \rightarrow 2Fe^{+3} + 2Cl^{-1} \qquad (5)$$

$$2Cu^{+1} + Cl_2 \rightarrow 2Cu^{+2} + 2Cl^{-1} \qquad (6)$$

C. Regeneration Reactions $$Cu^{+1} + Fe^{+3} \rightarrow Cu^{+2} + Fe^{+2} \qquad (7)$$

$$Cu° + Cu^{+2} \rightarrow 2Cu^{+1} \qquad (8)$$

$$Cu° + Fe^{+3} \rightarrow Cu^{+1} + Fe^{+2} \qquad (9)$$

$$Cu° + 2Fe^{+3} \rightarrow Cu^{+2} + 2Fe^{+2} \qquad (10)$$

The leaching step is generally conducted at a pH of about 2.5 or less. In normal operation no pH adjustment is required, but if adjustment should be necessary the use of hydrochloric acid is suitable. Should the pH of the leach solution rise above about 2.5, ferric hydroxide will precipitate:

$$Fe^{+3} + 3H_2O \rightarrow Fe(OH)_3 + 3H^+ \qquad (11)$$

This reaction can create an undesirable level of solids in the leach solution and cause difficulty in subsequent separation steps. Also, at higher pH levels copper will precipitate and be lost with the tailings in the first separation. It is therefore important that the pH be controlled during leaching, preferably in the range of about 0.5 to about 1.5.

As can be seen from equations 1-4, contacting ferromanganese with acid aqueous solution containing cuprous and cupric ions results in dissolution of the manganese and iron, and formation of elemental copper at the ferromanganese surface. This reaction is rapid and little or no hydrogen is evolved, so foaming of the leach solution is not a problem. Chlorine is introduced into the solution, and as shown in equations 5 and 6 it is absorbed rapidly and smoothly with the generation of cupric and ferric ions. Chlorine may be introduced either as liquid or gas, although the use of gas gives rise to fewer handling difficulties. The leach solution may be at any temperature up to the boiling point during the introduction of chlorine, however the absorption is chlorine is facilitated by lower temperatures, preferably below about 80° C. Since the overall leaching reaction is exothermic, it may be desirable to incorporate cooling means into the reactor in order to maintain the preferred temperature range of 60°–80° C.

The cupric and ferric ions in the leach solution react to solubilize elemental copper, regenerating cuprous and cupric ions into the solution as shown in equations 8–10. These ions are then available again for solubilizing manganese and iron, and for further chlorine absorption. The dissolved copper thus provides a continuously available redox intermediate for the leaching of manganese and the absorption of chlorine into the solution. The initial copper content of the solution is preferably derived from soluble copper salts.

The concentration of copper, best defined as the weight of copper (all chemical forms) per unit volume of leach solution, may vary over a wide range. The concentration is not truly critical to operation of the process, although it can affect the efficiency and economics. As the copper concentration increases, solubility of salts in the solution may be a problem, and the bulk of precipitated materials to be separated from the solution in subsequent steps may become unwieldy. At very low concentrations of copper, the rate at which ferromanganese and chlorine are introduced into the solution must be carefully monitored. If the feed is too rapid soluble copper may be depleted, and the excess ferromanganese, unprotected by a surface layer of metallic copper, will begin to evolve hydrogen, the pH will rise, and the advantages of the copper redox system will be lost. From a practical point of view, copper concentrations below about 10 grams per liter do not provide sufficient leeway for economic operation. A range of from about 30 to about 60 grams of copper per liter of leach solution is preferred for most efficient operation.

Using the preferred copper concentration, the redox system will normally operate smoothly. However, it is desirable to monitor the relative rates of introduction of ferromanganese and chlorine into the leach solution. As mentioned above, overfeeding of ferromanganese can deplete the solution of the copper redox intermediate, while underfeeding ferromanganese relative to the rate of chlorine introduction can deplete the cuprous and ferrous constituents of the solution and chlorine absorption will cease.

Since oxidation potential is a function of the ratio of oxidized ion form to reduced form, this potential will be directly related to the reduced form of the cations (i.e. $Fe^{+2}$ and $Cu^{+1}$) in the solution. Thus the use of oxidation potential has been found to be a practical means of controlling the addition rate of both ferromanganese and chlorine. In the usual practice the optimum concentration of $Fe^{+2}$ and $Cu^{+1}$ is first determined by chemical analysis. The oxidation potential of this solution is then measured and the reactants are added at a rate which maintains the desired potential. The system thus lends itself well to automatic feed control. Alternatively, the appropriate balance of manganese feed and chlorine flow can easily be determined by routine experimentation, using one of the many control methods available such as chemical analysis or solution color.

Since the major reactants are introduced into the leach solution without associated water, the concentration of manganous chloride in the leach solution and the product solution can be adjusted to any desired level by a simple water addition. There is of course no theoretical lower concentration limit, and the maximum concentration is controlled by the possibility of solid crystalline phases of excessive solution viscosity. At concentrations above about 350 grams of manganese per liter, viscosity becomes a problem in the subsequent separation steps. The preferred range for manganese in the leach solution has been found to be between about 200 and 250 grams per liter.

As the manganese concentration in the leach solution nears the desired level, the introduction of ferromanganese is stopped. Chlorine feed continues until all of the manganese and elemental copper is solubilized. Carbon, silica, and other insolubles are then separated from the solution. Conventional methods such as settling, decanting, and centrifuging are satisfactory, and filtration has been found to be most practical. The insolubles are discarded as tailings, and any wash may be recycled to the leach solution. This separation step is important to the success of the overall method, since removal of carbon and insolubles at this stage permits the subsequent recovery and recycle of copper without an undesirable buildup of carbon in the circuit.

The solution remaining after this initial separation step contains dissolved manganese, iron, copper, and chloride. Sufficient manganese-containing material such as ferromanganese is introduced into this solution to provide a stoichiometric excess of manganese in relation to the copper present. Reactions 1–4 are driven to completion, resulting in the dissolution of additional manganese and the precipitation of essentially all of the copper as elemental copper. The amount of manganese necessary can be easily determined by chemical analysis of the solution for its copper content. The only requirement is that a stoichiometric excess of manganese be used, and the presence of a large excess is not harmful since undissolved material may be returned to the leaching step.

The solids remaining after this manganese addition are separated from the solution, again by conventional techniques such as filtration. These solids, comprising undissolved manganese, iron, and minor amounts of inerts, as well as the precipitated copper metal, may be directly recycled to the leach solution to avoid loss of any metal values. The separated solution, now richer in manganese and also containing iron and chloride, may be further treated to remove iron and recover pure manganous chloride. This further treatment normally consists of raising the solution pH to precipitate iron and other heavy metals present as their hydroxides. There are numerous techniques known for this precipitation step, including the addition of hydroxides, carbonates, or sulfides. A most suitable technique uses the addition of $MnO_2$ to oxidize ferrous ions in the solution and precipitate iron as ferric hydroxide. The use of MnO or $Mn(OH)_2$ as a precipitating agent is also suitable, since no additional metals are introduced into the solution. After removal of the precipitated iron, a highly pure solution rich in manganous chloride results.

The method of the invention is further illustrated in the following specific example.

EXAMPLE

A reactor of approximately 11 liters capacity was charged with 9.5 liters water and 1.1 kilogram of $CuCl_2.2H_2O$. The solution was thoroughly agitated to dissolve the cupric chloride, and circulation was begun through an external system containing a heat exchanger, chlorine inlet, and monitors for temperature, pH, specific gravity, and oxidation potential of the solution.

About 200 grams of high carbon ferromanganese alloy (sized to 12 mesh and smaller, and containing about 75% manganese, 14% iron, and 6.4–6.9% carbon) was introduced into the reactor, and chlorine gas was added to the circulating stream at a rate of 5–6 liters per minute. The feed of ferromanganese and chlorine was regulated to maintain a solution oxidation potential of about 200 m.v., optimum for this sytem. Over a reaction time of 205 minutes, a total of 3200 grams of alloy was added. Observations as the reaction progressed are set forth in the following Table.

TABLE

| Time (min) | Temp. °C. | pH | m.v. | $Cl_2$ l/min | Sp. Gr. | Cu g/l | Fe g/l | Mn g/l |
|---|---|---|---|---|---|---|---|---|
| 0 | 65 | — | — | 0 | — | 46 | — | — |
| 15 | 68 | — | 500 | 5 | — | — | — | — |
| 40 | 77 | 2.5 | 450 | 6 | — | — | — | — |
| 65 | 65 | 2.0 | 320 | 6 | 1.22 | 44 | 8 | 81 |
| 80 | 63 | 1.9 | 250 | 6 | 1.25 | — | — | — |
| 95 | 68 | 1.8 | 300 | 4 | 1.30 | 41 | 10 | 118 |
| 130 | 70 | 1.5 | 250 | 4 | 1.35 | 43 | 13 | 145 |
| 157 | 55 | 1.4 | 200 | 3 | 1.41 | — | — | — |
| 205 | — | — | — | 0 | — | 43 | 21 | 200 |

A four liter portion of the solution was filtered and the solids were water washed. The combined filtrate and washings were then treated with about 475 grams of ferromanganese to precipitate the copper. The precipitated copper sludge was separated by filtration and returned to the reactor. The copper-free filtrate was acidified to a pH of 0.5, and $MnO_2$ was slowly added to oxidize the ferrous iron to the ferric state. The conversion of the ferrous was monitored by analysis of the solution, and the $MnO_2$ addition was stopped when the analysis showed no ferrous was present. The pH of the solution was then adjusted to 3.5–4.0 by the addition of MnO, and the resulting ferric hydroxide sludge was removed by filtration. The filtrate was a solution containing about 570 grams per liter of $MnCl_2$, free of iron and copper.

What is claimed is:

1. A method for the preparation of manganese chloride solution, which comprises:
   (a) contacting a manganese-containing metal with an aqueous solution containing at least 10 grams of copper per liter, at a pH of less than about 2.5;
   (b) introducing elemental chlorine into the solution;
   (c) separating insolubles from the solution;
   (d) introducing sufficient manganese-containing metal into the solution to provide a stoichiometric excess of manganese in relation to the copper content;
   (e) separating insoluble copper and manganese from the solution; and
   (f) recovering a manganous chloride solution.

2. The method of claim 1 wherein said manganese-containing metal contains at least one metal other than manganese and including the subsequent step of:
   (g) treating the solution to separate hydroxides of metals other than manganese, and recovering manganous chloride solution.

3. The method of claim 2 wherein a basic manganese compound is used to treat the solution and precipitate hydroxides of metals other than manganese.

4. The method of claim 1 wherein the manganese-containing metal is a ferromanganese.

5. The method of claim 1 wherein the manganese-containing metal is a manganese alloy.

6. The method of claim 1 wherein the solution of step (a) contains from about 30 to about 60 grams of copper per liter.

7. The method of claim 1 wherein the solution of step (a) is maintained at a pH of 0.5–1.5.

8. The method of claim 1 wherein the contacting of step (a) is conducted in a slurry.

9. The method of claim 1 wherein the solution temperature is maintained below about 80° C. during the chlorine introduction of step (b).

10. The method of claim 1 wherein the manganese concentration in the solution of step (a) is maintained at less than about 350 grams per liter.

11. The method of claim 1 wherein the insoluble copper and manganese recovered from step (e) is recycled to the solution of step (a).

12. A method for the preparation of manganous chloride solution, which comprises
   (a) leaching ferromanganese with an aqueous solution containing 30–60 grams of copper per liter, at a pH of 0.5–1.5, to solubilize the manganese and iron and form elemental copper;
   (b) introducing chloride gas into the solution at 60°–80° C. to oxidize cuprous and ferrous ions, simultaneously absorbing chlorine into solution and solubilizing elemental copper by reaction with cupric and ferric ions;
   (c) filtering the solution to remove insoluble carbon, silica, and inert materials;
   (d) introducing sufficent ferromanganese into the filtrate to provide a stoichiometric excess of manganese and iron in relation to the copper content, in order to reduce the copper to the elemental state;
   (e) filtering the resulting solution to remove copper and unreacted ferromanganese; and
   (f) recovering the filtrate rich in manganous chloride.

13. The method of claim 12 including the additional step of
   (g) treating the filtrate with a basic manganese compound to precipitate iron as the hydroxide, filtering to remove the precipitate, and recovering high purity manganous chloride solution.

14. The method of claim 12 wherein the copper and ferromanganese removed in step (e) is recycled to the leach solution of step (a).

15. The method of claim 12 wherein the leaching of step (a) is conducted in a slurry containing from about 200 to about 250 grams of manganese per liter.

* * * * *